Aug. 11, 1970     C. R. SCHUDEL     3,523,858
VENTILATED HONEYCOMB STRUCTURE
Filed May 21, 1964
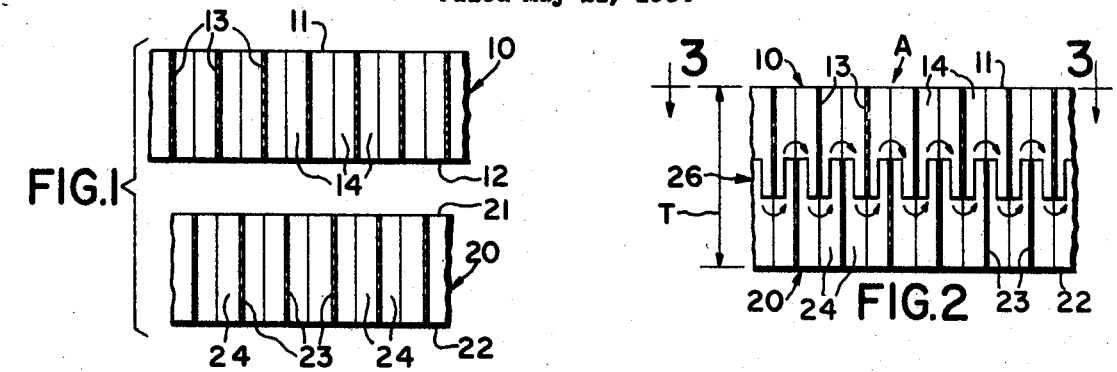
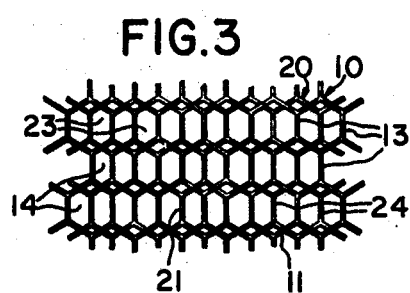
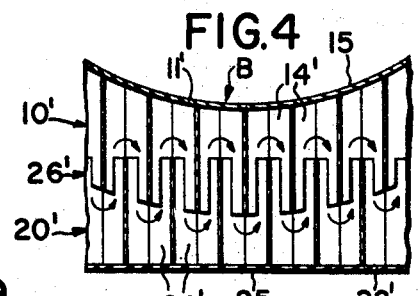
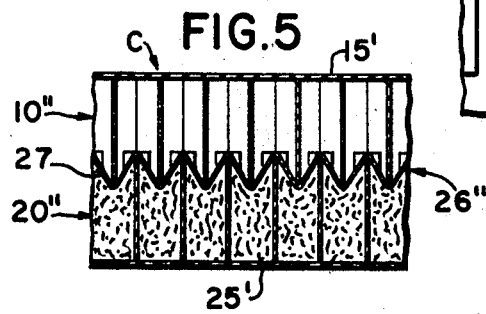
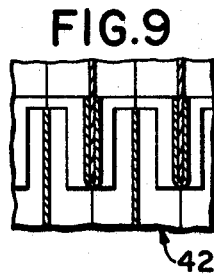
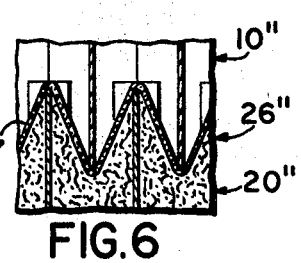
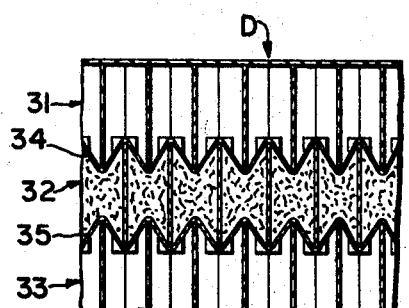
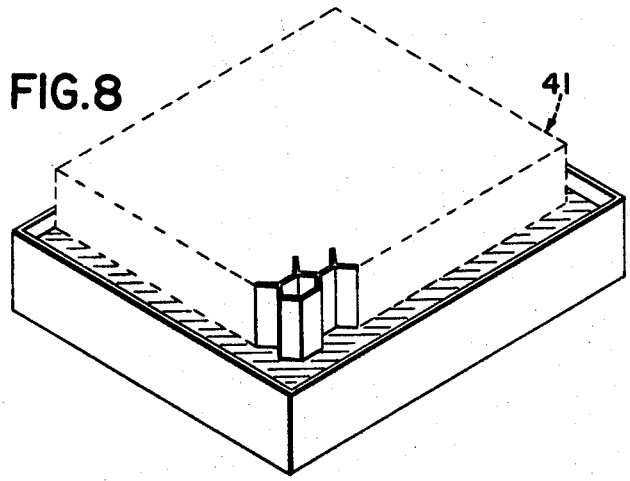
INVENTOR.
CONRAD R. SCHUDEL
BY
Townsend & Townsend
ATTORNEYS

United States Patent Office 3,523,858
Patented Aug. 11, 1970

3,523,858
VENTILATED HONEYCOMB STRUCTURE
Conrad R. Schudel, Irving, Tex., assignor to Hexcel Products, Inc., Berkeley, Calif.
Filed May 21, 1964, Ser. No. 369,249
Int. Cl. B32b 3/12; E04c 2/34
U.S. Cl. 161—69                         8 Claims

ABSTRACT OF THE DISCLOSURE

A honeycomb product or honeycomb sandwich and method of making same is disclosed wherein at least two sheets of honeycomb are forceably compressed together so that the cell edges at the abutting faces of the honeycomb sheets cut into one another to interlock the sheets and to provide intercellular communication in the cells of one sheet through the cells of another. Permeable membranes can be provided in the region of interpenetration of the honeycomb sheets, face skins can be provided to produce a sandwich structure and the cell walls of the respective sheets can be bonded at the intersections.

---

This invention relates in general to ventilated panel structures, and more particularly to ventilated honeycomb and honeycomb sandwich structures.

Honeycomb, because of its high strength-to-weight ratio, is a good material for structural panel members utilized in a variety of different environments. In many applications such as, for example, in cryogenic containers in which the panel is ultimately evacuated or in environments where large thermal gradients are established across the honeycomb panel, it is desirable to provide communication between the several honeycomb cells which make up the panel for air circulation, venting or evacuation. One typical application is in a heat exchanger such as a deicer for radomes or airplane wings, either the leading edge or an entire panel. In the past communication has been provided by perforation in the honeycomb cell walls. If these perforations are small they tend to restrict the air flow rate within the panel or tend to close up, while if the perforations are large they tend to seriously reduce the physical properties of the panel.

Broadly stated, the present invention, to be described in greater detail below, is directed to a ventilated honeycomb structure and method of making same wherein two or more sheets of honeycomb material are placed face-to-face with the axes of the cells in each of the honeycomb sheets aligned substantially parallel. The sheets are forcibly compressed together so that the cell edges at the abutting faces of the sheets cut into one another with the result that the abutting face of each of the honeycomb sheets is compressed into the adjacent honeycomb sheet so that the sheets are interlocked together and each of the initial abutting sheet faces lies within the adjacent honeycomb sheet.

With the honeycomb panel constructed in accordance with this invention, a circuitous passageway or duct is provided along the interlocking region between the honeycomb sheets for circulation within the panel or for venting the honeycomb panel while retaining the structural strength of the honeycomb members. This passageway provides greater circulation within the panel than small perforations in cell walls while still retaining the physical properties of the honeycomb.

Additionally, the honeycomb sheets which serve to form the ventilated honeycomb panel can be forcibly compressed together just the desired amount to produce a honeycomb panel of desired thickness, thereby eliminating the necessity for accurately machining a single honeycomb panel to the desired thickness.

Additionally, ventilated honeycomb sandwich panels are constructed in accordance with this invention utilizing a ventilated honeycomb core of the type described above which is provided on the two broad surfaces thereof with face skins or sheets which cover the open ends of the honeycomb cells. This ventilated honeycomb sandwich structure has the obvious advantage of extremely high strength-to-weight ratio and can be easily fabricated with contoured face surfaces by compressing two honeycomb sheets together using compressing surfaces having the desired contour for the surfaces of the honeycomb sandwich panel. The difference between the contour of the initial honeycomb sheets and the contour of the completed honeycomb panels is taken up in the interlocking region between the two honeycomb sheets that are compressed together. Obviously, with this construction it is not necessary to fabricate or machine the honeycomb sheets to very close tolerances, even though the final honeycomb panel must be produced within very close tolerances so long as the compression step is performed properly.

Another aspect of the present invention is the provision of a separating porous filter material in the interlocking region between the honeycomb sheets which go to make up the final honeycomb panel. This porous filter material which may comprise, for example, glass cloth, is positioned between the two honeycomb sheets before compression and is deformed with the interlocking of the two honeycomb panels to provide a porous membrane across the region between the honeycomb cells of the individual honeycomb sheets.

A honeycomb panel constructed with this porous separating filter material allows circulation and venting of the several honeycomb cells in the panel while, at the same time, permitting compartmentalization of the cells within the panel so as to permit storage of materials such as, for example, insulation materials in certain cells.

Also, in accordance with the present invention, the honeycomb sheets which go to form the final honeycomb panel or sandwich can be bonded together by coating the cell walls adjacent the surfaces of the honeycomb sheets with a bonding material and curing the bonding material after the sheets have been compressed together. The bonding material can be, for example, a heat-setting adhesive or a solder or brazing material if metallic honeycomb sheets are employed. While the honeycomb sheets are interlocked and rigidly held together when they have been merely compressed together, the addition of a bonding material joining the separate cell walls of the two honeycomb sheets adds to the strength of the finalized honeycomb panel.

As will become more apparent in the detailed description below, any number of honeycomb sheets can be compressed together to form the ventilated honeycomb sandwich structure and the interior of any one of these sheets can be segregated by means of skin or mesh layers at the interface with adjoining sheets.

Other objects of the present invention will become apparent upon reading the following specification and referring to the accompanying drawings in which similar characters of reference represent corresponding parts in each of the several views.

In the drawings:

FIG. 1 is a schematic side view illustrating two honeycomb sheets prior to compression;

FIG. 2 is a schematic side view showing the two honeycomb sheets illustrated in FIG. 1 after they have been compressed together;

FIG. 3 is a top view of the structure shown in FIG. 2;

FIG. 4 is a schematic side view of a honeycomb sandwich structure constructed in accordance with the present invention;

FIG. 5 is a schematic side view of a honeycomb sandwich structure incorporating a porous membrane;

FIG. 6 is an enlarged sectional view of a portion of the structure shown in FIG. 5;

FIG. 7 is a schematic side view of a honeycomb sandwich structure made from three honeycomb sheets;

FIG. 8 is a schematic perspective view illustrating one manner in which the honeycomb sheets are coated with adhesive material; and FIG. 9 is an enlarged sectional view showing a portion of a honeycomb panel constructed utilizing the step illustrated in FIG. 8.

Referring now to the drawing, with particular reference to FIGS. 1–3, a honeycomb panel A of desired thickness T is constructed from a first sheet of honeycomb 10 having top and bottom surfaces 11 and 12, respectively, and cell walls 13 defining honeycomb cells 14 and a second sheet of honeycomb 20 having top and bottom surfaces 21 and 22, respectively, and cell walls 23 defining cells 24. In the honeycomb sheets 10 and 20 the respective cells 14 and 24 preferably extend directly between the respective top and bottom surfaces 11 and 12 and 21 and 22. These two honeycomb sheets 10 and 20 are positioned one on top of the other with the axes of the cells 14 and 24 aligned subsantaially parallel but preferably not coaxial. The two sheets 10 and 20 are then compressed together by compression means such as, for example, pressure plates (not shown) applied to the surfaces 11 and 22 and actuated by hydraulic pistons (not shown) to force the honeycomb sheets together so that the cell wall edges at the adjacent surfaces 12 and 21 cut into one another until the resultant thickness of the combined sheets 10 and 20 is the desired thickness T.

In this compressed form, the bottom surface 12 of the top first sheet 10 lies within the boundaries of the sheet 20 and the top surface 21 of the bottom second sheet 20 lies within the boundaries of the sheet 10 thereby forming an interlocking zone 26 in which the two sheets 10 and 20 are locked together. This interlocking zone 26 may be any depth up to a thickness just short of the thickness of the thinner of the two sheets 10 and 20.

The honeycomb sheets 10 and 20 can be of any suitable material such as, for example, paper, plastic, metal or the like in which the strength of the cell walls 13 and 23 is such as to cut the cell walls of the adjacent honeycomb sheet and/or be cut during compression rather than collapse the cell walls. Obviously, the sheets 10 and 20 may be of different materials, in which case all of the cell wall cutting or shearing may be done in only one of the honeycomb sheets.

The final honeycomb panel A is provided with a circuitous passageway or duct substantially along the interlocking zone 26 whereby circulation is provided between the various cells 14 and 24 and the panel A can be vented or evacuated by means of this duct.

While the cells of the individual honeycomb sheets 10 and 20 can be of different sizes, it is preferred that the cell sizes of the honeycomb sheets are the same so that when the honeycomb sheets are placed one on top of another for compression, the cells can be located such that the cells are not coaxial. When the cells are coaxial, compression of the sheets is quite difficult, and the passageway along the interlocking zone is partially obstructed.

If the honeycomb panel A is to form the core for a compartment, bulkhead or the like the compression plates can be positioned immediately adjacent the walls of the compartment or bulkhead and the panel A slid thereinto while still under compression.

Referring now to FIG. 4, there is shown a ventilated honeycomb sandwich structure B formed of two honeycomb sheets 10' and 20' compressed and interlocked together in an interlocking zone 26'. The top surface 11' of the honeycomb sheet 10' and the bottom surface 22' of the honeycomb sheet 20' are provided with face skins or sheets 15 and 25 respectively which close the otherwise open ends of the cells 14' and 24' to form an enclosed panel within which circulation can take place along the interlocking zone 26'.

The panel B is constructed by either compressing the unenclosed sheets 10' and 20' together with pressure plates contoured to the desired shape and thereafter covering the top and bottom surfaces 10' and 22' with the respective face skins 15 and 25 or preferably by first securing the face skins 15 and 25 to the respective honeycomb sheets 10' and 20' and thereafter compressing the honeycomb sheets 10' and 20' together with pressure plates contoured to the desired shape. As is evident from the drawing, the difference between the initial flat contour of the honeycomb sheet surfaces and the contour of the surfaces of the honeycomb panel B is accommodated in the interlocking zone 26'.

In most instances, while the final configuration of the face skins 15 and 25 of the honeycomb panel B must be maintained within close tolerances, these tolerances may be achieved in the compression process and need not be achieved in the initial formation of the honeycomb panels 10' and 20'.

Referring now to FIGS. 5 and 6, there is shown another panel C produced in accordance with the present invention wherein a porous or air permeable member or filter 27 is provided between the two honeycomb panels 10'' and 20'' which form the core of the honeycomb sandwich panel C. The porous filter or membrane 27 can be any deformable porous material such as, for example, glass cloth, which is positioned between the two honeycomb panels 10'' and 20'' before compression. While the panels are being compressed, the filter or membrane 27 is deformed to essentially conform to the circuitous path or duct at the interlocking zone 26'' between the two panels 10'' and 20''. With this filter or membrane 27, the cells of the different sheets are separated from one another for separate storage of materials such as, for example, insulating glass wool.

There can also be instances in which it would be desirable to utilize more than two honeycomb sheets to form a panel such as that illustrated in FIG. 7. As illustrated there, the panel D is formed by compressing together three honeycomb panels 31, 32 and 33 with porous membranes 34 and 35 positioned at the two interfaces between the three sheets. In this manner, the central-most honeycomb sheet 32 can be filled with an insulating material which separates the air spaces in the sheets 31 and 33.

Referring now to FIGS. 8 and 9, there is shown one method in which the cell walls of the separate honeycomb sheets can be bonded together after the sheets have been compressed to form the interlocking zone therebetween. As illustrated, the abutting surface of one or both of the honeycomb sheets 41 and 42 which ultimately form the ventilated honeycomb panel, is coated with a bonding material by, for example, dipping the honeycomb sheet into a solution of bonding material. The bonding material can be a material appropriate for the material from which the honeycomb sheets are formed. For example, if the honeycomb sheets are made of paper or wood fibrous material, the bonding materials may be, for example, a heat-setting adhesive and if the honeycomb sheets are made of metal, the bonding material may be a silver solder or braze material. After the honeycomb sheets 41 and 42 have been compressed together to form the interlocking zone 43, the honeycomb panel is suitably treated such as, for example, by the application of heat to set the bonding material in order to create a bond between the intersecting cell walls of the separate honeycomb sheets. Obviously, this bond adds to the strength and stability of the final honeycomb panel formed by compressing the honeycomb sheets together.

It is claimed:

1. A honeycomb product comprising at least a first sheet of honeycomb having cell walls defining a plurality of cells and a second sheet of honeycomb having cell walls defining a plurality of cells, said cell walls of said first honeycomb sheet intersecting said cell walls and projecting into said cells of said second honeycomb sheet and said cell walls of said second honeycomb sheet projecting into said cells of said first honeycomb sheet with said cells of said first honeycomb sheet communicating with one another via said cells of said second honeycomb sheet and said cells of said second honeycomb sheet communicating with one another via said cells of said first honeycomb sheet.

2. A honeycomb product comprising a first sheet of honeycomb having cell walls defining a plurality of cells, a second sheet of honeycomb having cell walls defining a plurality of cells, said cell walls of said first honeycomb sheet intersecting said cell walls and projecting into said cells of said second honeycomb sheet and said cell walls of said second honeycomb sheet projecting into said cells of said first honeycomb sheet, and an air permeable member lying in the region where said honeycomb sheets project into one another whereby the honeycomb product is provided with an air passage along said region.

3. A honeycomb product comprising a first sheet of honeycomb having cell walls defining a plurality of cells, a second sheet of honeycomb having cell walls defining a plurality of cells said cell walls of said first honeycomb sheet intersecting said cell walls and projecting into said cells of said second honeycomb sheet and said cell walls of said second honeycomb sheet projecting into said cells of said first honeycomb sheet with said cells of said first honeycomb sheet communicating with one another via said cells of said second honeycomb sheet and said cells of said second honeycomb sheet communicating with one another via said cells of said first honeycomb sheet and means forming a bond between said cell walls of said first honeycomb sheet and said cell walls of said second honeycomb sheet at said intersections thereof.

4. A honeycomb product comprising a first sheet of honeycomb having cell walls defining a plurality of cells and a second sheet of honeycomb having cell walls defining a plurality of cells, the axes of said cells of said first honeycomb sheet aligned substantially parallel but offset with respect to the axes of said cells of said second honeycomb sheet so that the cell walls of said sheets intersect and only partially penetrate into one another a distance less than the thickness of either sheet thereby providing a fluid passage along the region where said honeycomb sheets partially penetrate into one another.

5. A ventilated honeycomb sandwich product comprising a first sheet of honeycomb having opposed broad faces and having cell walls aligned substantially transverse to said faces and defining a plurality of cells, a second sheet of honeycomb having opposed broad faces and having cell walls aligned substantially transverse to said faces and defining a plurality of cells, said cell walls of said first honeycomb sheet at one of said faces intersecting and penetrating the cell walls of said second honeycomb sheet at one of said faces thereof, and face skins covering the other of said faces of said first and said second honeycomb sheets.

6. A ventilated honeycomb sandwich product comprising a first sheet of honeycomb having opposed broad faces and having cell walls aligned substantially transverse to said faces and defining a plurality of cells, a second sheet of honeycomb having opposed broad faces and having cell walls aligned substantially transverse to said faces and defining a plurality of cells, said cell walls of said first honeycomb sheet at one of said faces thereof interconnecting and penetrating the cell walls of said second honeycomb sheet at one of said faces thereof, means forming a bond between said cell walls of said first honeycomb sheet and said cell walls of said second honeycomb sheet at the intersections thereof, and face skins covering the other of said faces of said first and ssaid second honeycomb sheets.

7. A ventilated honeycomb sandwich product comprising a first sheet of honeycomb having opposed broad faces and having cell walls aligned substantially transverse to said faces and defining a plurality of cells, a second sheet of honeycomb having opposed broad faces and having cell walls aligned substantially transverse to said faces and defining a plurality of cells, said cell walls of said first honeycomb sheet at one of said faces thereof intersecting and penetrating the cell walls of said second honeycomb sheet at one of said faces thereof, face skins covering the other of said faces of said first and said second honeycomb sheets, and an air permeable member lying in the region where said honeycomb sheets project into one another whereby the honeycomb sandwich product is provided with an air passage along said region.

8. A ventilated honeycomb sandwich product comprising at least a first sheet of honeycomb having opposed broad faces and having cell walls aligned substantially transverse to said faces and defining a plurality of cells, a second sheet of honeycomb having opposed broad faces and having cell walls aligned substantially transverse to said faces and defining a plurality of cells, said cell walls of said first honeycomb sheet at one of said faces thereof intersecting and penetrating the cell walls of said second honeycomb sheet at one of said faces thereof with said cells of said first honeycomb sheet communicating with one another via said cells of said second honeycomb sheet and said cells of said second honeycomb sheet communicating with one another via said cells of said first honeycomb sheet to provide communication within the honeycomb sandwich along the region where said honeycomb sheets project into one another and face skins covering the faces of the honeycomb sheets at the outside surfaces of the honeycomb product.

References Cited

UNITED STATES PATENTS

| | | | |
|---|---|---|---|
| 1,996,490 | 4/1935 | Romanoff | 161—132 |
| 2,501,180 | 3/1950 | Kunz | 161—68 |
| 2,836,863 | 6/1958 | Denker | 161—111 XR |
| 3,070,480 | 12/1962 | Breiner | 161—68 |
| 3,104,194 | 9/1963 | Zahorski | 161—51 |
| 2,860,740 | 11/1958 | Holland et al. | 156—197 XR |

FOREIGN PATENTS 157,430   1/1922   Great Britain.

EARL M. BERGERT, Primary Examiner

HENRY F. EPSTEIN, Assistant Examiner

U.S. Cl. X.R.
52—615; 264—152